United States Patent
Harmon et al.

(10) Patent No.: US 11,274,804 B1
(45) Date of Patent: Mar. 15, 2022

(54) WINDSHIELD LIGHT STRIP ASSEMBLY

(71) Applicants: David Harmon, St. Ann, MO (US);
Angela Spanger, St. Ann, MO (US)

(72) Inventors: David Harmon, St. Ann, MO (US);
Angela Spanger, St. Ann, MO (US)

( * ) Notice: Subject to any disclaimer, the term of this patent is extended or adjusted under 35 U.S.C. 154(b) by 0 days.

(21) Appl. No.: 17/361,255

(22) Filed: Jun. 28, 2021

(51) Int. Cl.
| | |
|---|---|
| *F21S 43/14* | (2018.01) |
| *F21V 23/00* | (2015.01) |
| *B62J 6/26* | (2020.01) |
| *F21S 4/28* | (2016.01) |
| *F21W 107/17* | (2018.01) |

(52) U.S. Cl.
CPC ............... *F21S 43/14* (2018.01); *B62J 6/26* (2020.02); *F21S 4/28* (2016.01); *F21V 23/001* (2013.01); *F21W 2107/17* (2018.01)

(58) Field of Classification Search
CPC ..... F21S 43/19; F21S 4/28; B62J 6/26; F21V 23/001; F21W 2107/17; B60Q 1/268
USPC .................................................. 362/473, 503
See application file for complete search history.

(56) References Cited

U.S. PATENT DOCUMENTS

| | | | |
|---|---|---|---|
| 5,590,947 A | 1/1997 | Kidd, Jr. | |
| 6,464,379 B1 | 10/2002 | Mc Kenna | |
| 6,700,502 B1 | 3/2004 | Pederson | |
| 8,840,288 B2* | 9/2014 | Plavetich | B60Q 1/268 |
| | | | 362/490 |
| 8,894,256 B2* | 11/2014 | Gold | B60Q 1/323 |
| | | | 362/503 |
| 9,534,764 B2 | 1/2017 | Trajlinek | |
| 10,618,462 B2* | 4/2020 | Beach | B60Q 1/28 |
| 11,009,207 B2* | 5/2021 | Olmr | B60R 16/033 |
| 2007/0210907 A1 | 9/2007 | Aron | |

* cited by examiner

*Primary Examiner* — Laura K Tso

(57) ABSTRACT

A windshield light strip assembly includes a molding that has a channel integrated into the molding to receive an outer edge of a windshield on a motorcycle. A plurality of light emitters is each integrated into the molding and each of the light emitters emits light outwardly from the molding. The light emitters are spaced apart from each other and are distributed along a full length of the molding. A wiring harness is coupled to the molding and the wiring harness is electrically coupled to a power source comprising an electrical system of the motorcycle. Additionally, each of the light emitters is in electrical communication with the wiring harness and each of the light emitters is turned on when the motorcycle is turned on.

7 Claims, 4 Drawing Sheets

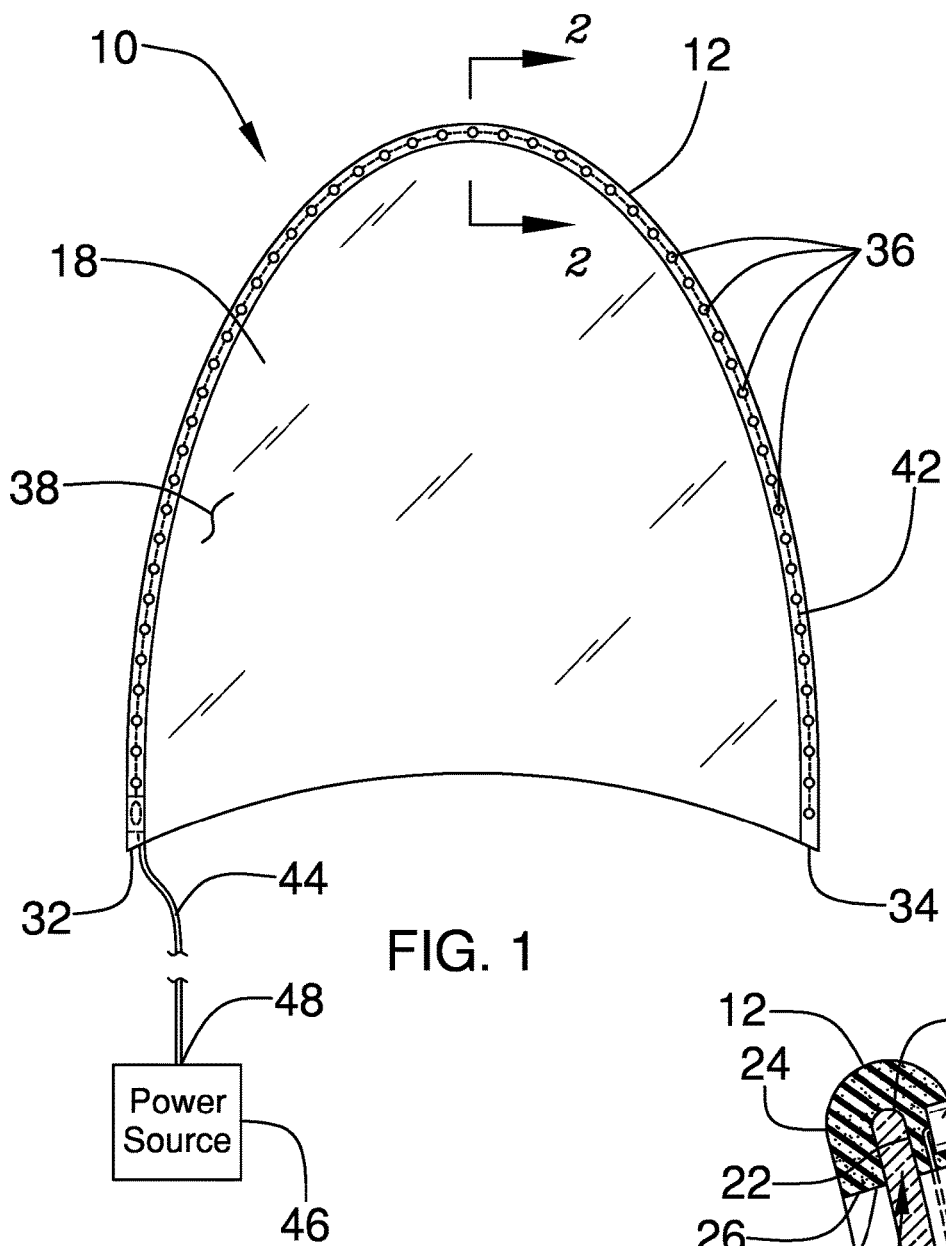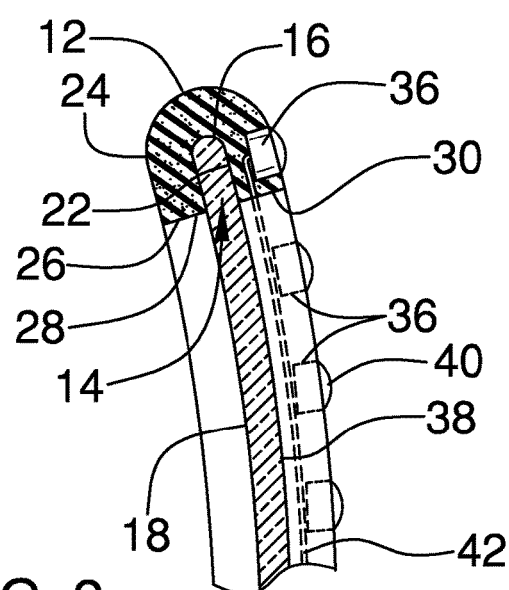

WINDSHIELD LIGHT STRIP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to light strip devices and more particularly pertains to a new light strip device for enhancing visibility of a motorcycle to motorists on a roadway. The device includes a molding that is positioned on an outer edge of a motorcycle windshield and a plurality of light emitters that is integrated into the windshield.

(2) Description of Related Art Including Information Disclosed Under 37 CFR 1.97 and 1.98

The prior art relates to light strip devices including a windscreen that has a plurality of light bulbs integrated into the windscreen for illuminating the windscreen. The prior art discloses a windshield trim member that is positionable around an edge of a windshield and a plurality of light emitters that are disposed between the trim member and the edge of the windshield for illuminating the windshield. The prior art discloses an illuminated fairing element that is attachable to a motorcycle fairing for illuminating the fairing.

BRIEF SUMMARY OF THE INVENTION

An embodiment of the disclosure meets the needs presented above by generally comprising a molding that has a channel integrated into the molding to receive an outer edge of a windshield on a motorcycle. A plurality of light emitters is each integrated into the molding and each of the light emitters emits light outwardly from the molding. The light emitters are spaced apart from each other and are distributed along a full length of the molding. A wiring harness is coupled to the molding and the wiring harness is electrically coupled to a power source comprising an electrical system of the motorcycle. Additionally, each of the light emitters is in electrical communication with the wiring harness and each of the light emitters is turned on when the motorcycle is turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a back view of a windshield light strip assembly according to an embodiment of the disclosure.

FIG. 2 is a cross sectional view taken along line 2-2 of FIG. 1 of an embodiment of the disclosure.

DETAILED DESCRIPTION OF THE INVENTION

Figure 3:
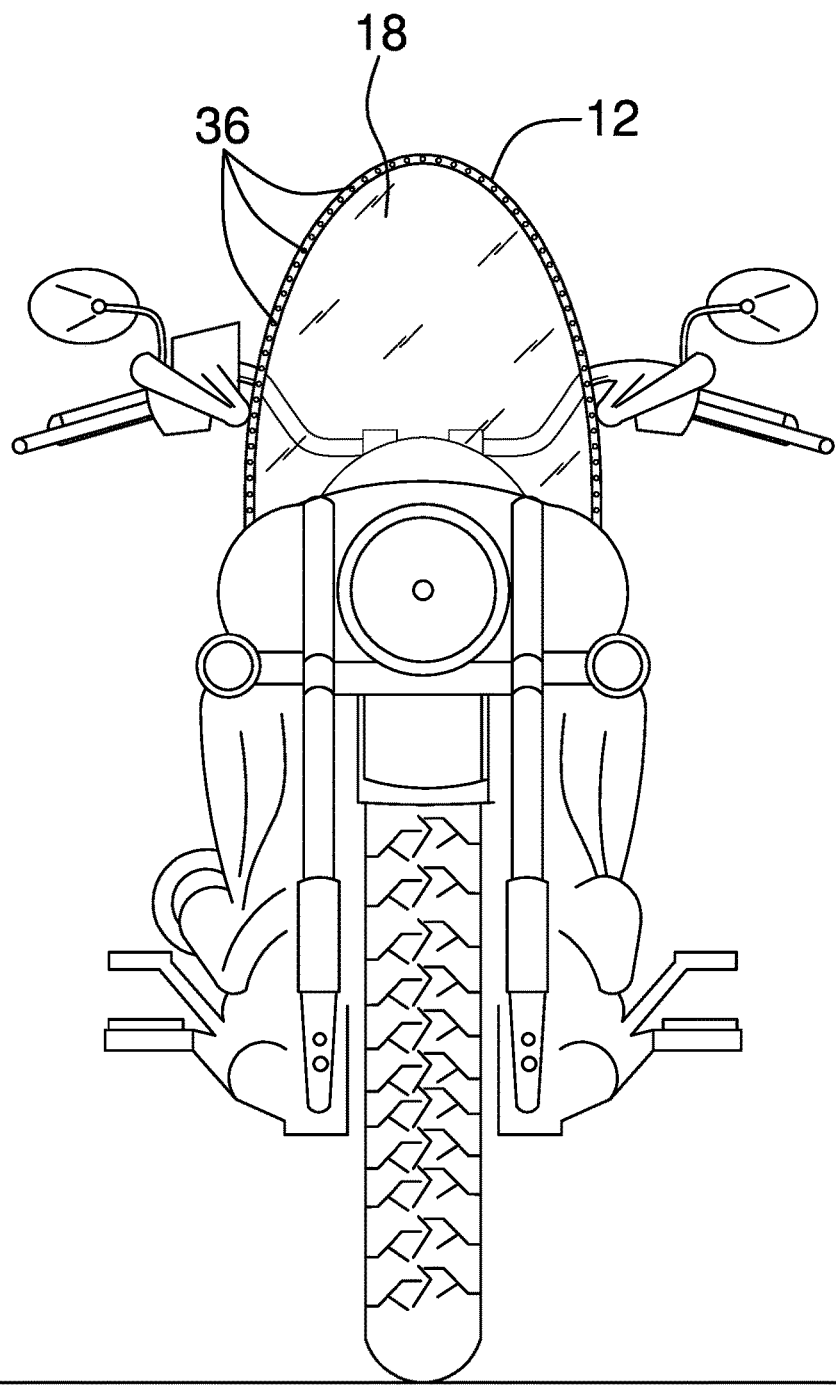
FIG. 3 is a front in-use view of an embodiment of the disclosure.
Figure 4:
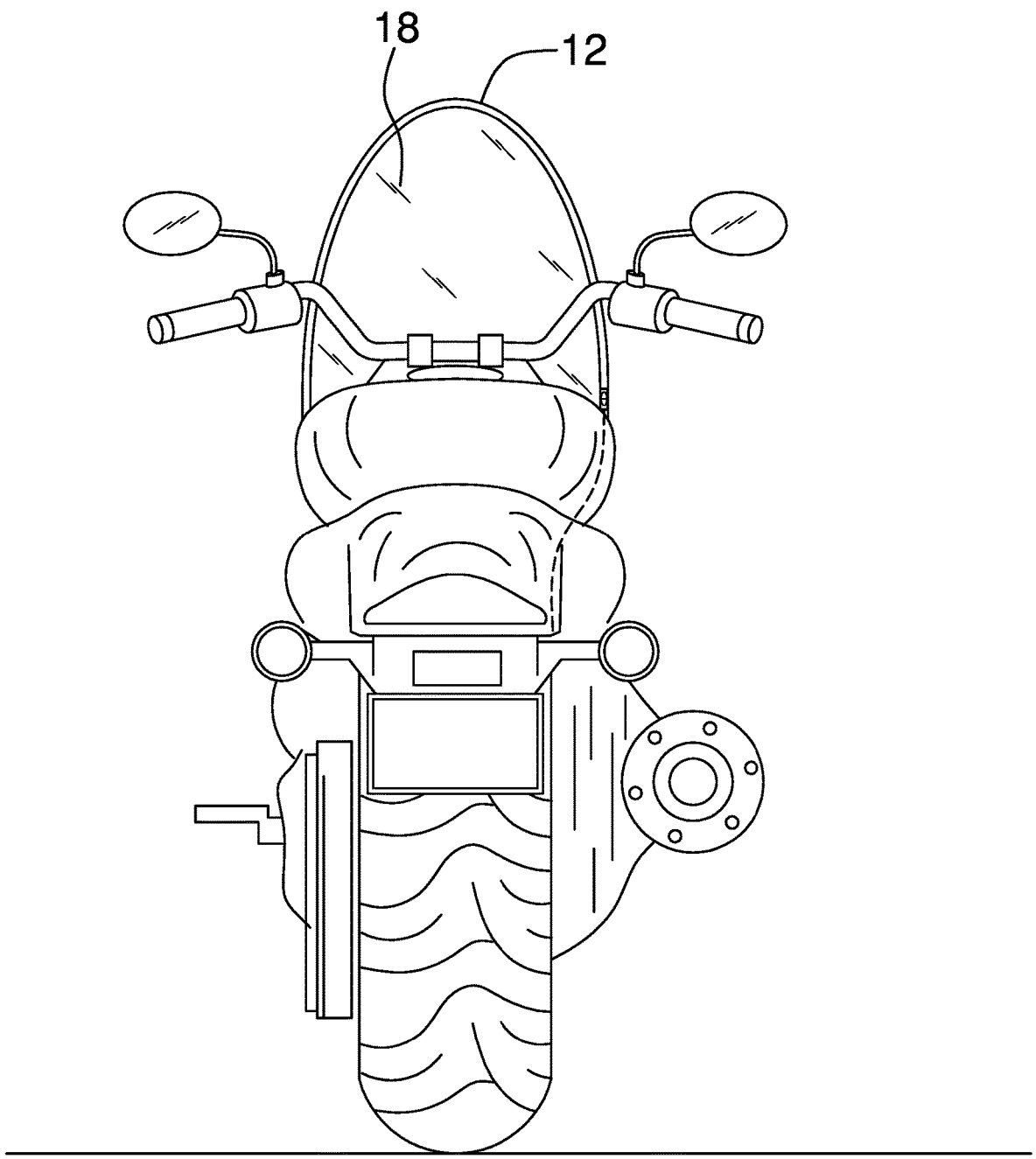
FIG. 4 is a rear in-use view of an embodiment of the disclosure.
Figure 5:
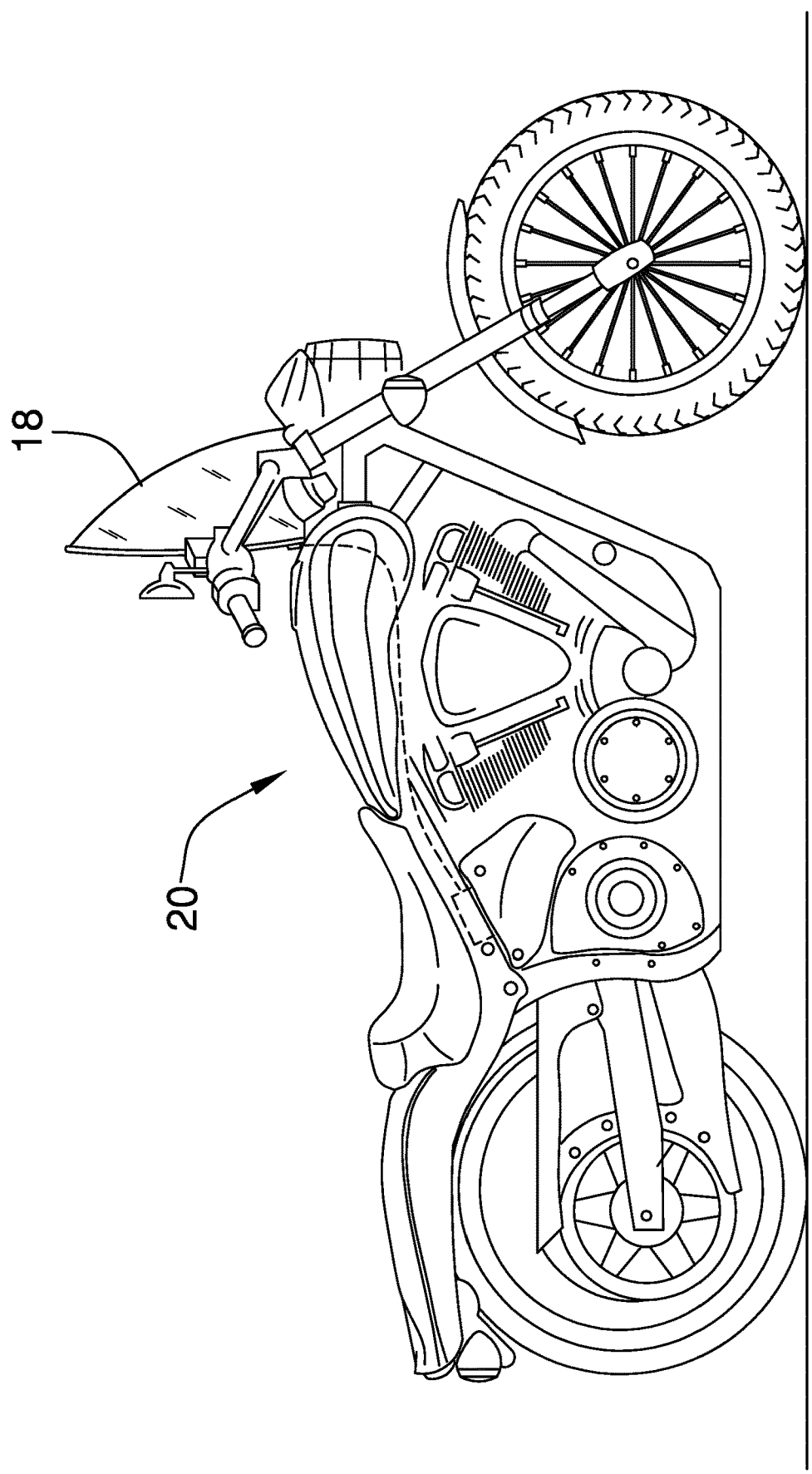
FIG. 5 is a right side in-use view of an embodiment of the disclosure.

With reference now to the drawings, and in particular to FIGS. 1 through 5 thereof, a new light strip device embodying the principles and concepts of an embodiment of the disclosure and generally designated by the reference numeral 10 will be described.

As best illustrated in FIGS. 1 through 5, the windshield light strip assembly 10 generally comprises a molding 12 that has a channel 14 integrated into the molding 12. The channel 14 in the molding 12 receives an outer edge 16 of a windshield 18 on a motorcycle 20. The motorcycle 20 may be an on-road motorcycle of any conventional design and the windshield 18 may be a motorcycle windshield of any conventional design. The molding 12 is elongated to extend along a full length of the outer edge 16 of the windshield 18 and the molding 12 is comprised of a deformable material to accommodate curvature of the outer edge 16 of the windshield 18. Additionally, the molding 12 may be manufactured in a variety of dimensions in order to accommodate a variety of styles and designs of motorcycle windshields.

The molding 12 has a first surface 22, a second surface 24 and a perimeter edge 26 extending between the first surface 22 and the second surface 24. The perimeter edge 26 has a front side 28, a back side 30, a first lateral side 32 and a second lateral side 34, and the molding 12 is elongated between the first lateral side 32 and the second lateral side 34. The first surface 22 is concavely arcuate between the front side 28 and the back side 30 has the front side 28 is aligned with the back side 30 such that the first surface 22 defines the channel 14.

A plurality of light emitters 36 is each integrated into the molding 12 to emit light outwardly from the molding 12. The light emitters 36 are spaced apart from each other and are distributed along a full length of the molding 12 such that the plurality of light emitters 36 is distributed across an entire length of the outer edge 16 of the windshield 18. Each of the light emitters 36 is integrated into the second surface 24 of the molding 12 and each of the light emitters 36 is positioned adjacent to the front side 28 of the perimeter edge 26 of the molding 12. In this way each of the light emitters 36 are positioned on a front surface 38 of the windshield 18 when the molding 12 is positioned on the windshield 18. The plurality of light emitters 36 is distributed between the first lateral side 32 and the second lateral side 34 of the perimeter edge 26 of the molding 12.

Each of the light emitters 36 includes a lens 40 and the lens 40 associated with each of the light emitters 36 is exposed on the second surface 24 of the molding 12. The lens 40 associated with each of the light emitters 36 is comprised of a translucent material to emit light outwardly through the lens 40. Each of the light emitters 36 may comprise a light emitting diode or other type of electronic light emitter. Additionally, each of the light emitters 36 may be capable of emitting light in a plurality of different colors.

A conductor 42 is provided and the conductor 42 is integrated into the molding 12. The conductor 42 is electrically coupled to each of the plurality of light emitters 36 such that each of the plurality of light emitters 36 is in electrical communication with each other. The conductor 42 is comprised of an electrically conductive material, such as copper or other metal commonly employed in electrical circuitry. A wiring harness 44 is coupled to the molding 12 and the wiring harness 44 is electrically coupled to a power source 46 comprising an electrical system of the motorcycle 20. Each of the light emitters 36 is turned on when the motorcycle 20 is turned on and the wiring harness 44 is electrically coupled to the conductor 42. The wiring harness 44 has a distal end 48 with respect to the first lateral side 32 of the perimeter edge 26 of the molding 12 and the distal end 48 is electrically coupled to the power source 46.

In use, the molding 12 is positioned on the outer edge 16 of the windshield 18 and the wiring harness 44 is electrically coupled to the power source 46. In this way the light emitters 36 are distributed around the outer edge 16 of the windshield 18 and the light emitters 36 are turned on when the motorcycle 20 is turned on. Thus, the light emitters 36 enhance visibility of the motorcycle 20 for oncoming motorists on a roadway. In this way the light emitters 36 reduce the likelihood that an oncoming motorist will get into an accident with the motorcycle 20. Each of the light emitters 36 is turned off when the motorcycle 20 is turned off.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A windshield light strip assembly being attachable to a perimeter of a motorcycle windshield for enhancing visibility of the motorcycle, said assembly comprising:

a molding having a channel being integrated into said molding wherein said molding is configured to receive an outer edge of a windshield on a motorcycle, said molding being elongated wherein said molding is configured to extend along a full length of the outer edge of the windshield, said molding being comprised of a deformable material wherein said molding is configured to accommodate curvature of the outer edge of the windshield;

a plurality of light emitters, each of said light emitters being integrated into said molding wherein each of said light emitters is configured to emit light outwardly from said molding, said light emitters being spaced apart from each other and being distributed along a full length of said molding wherein said plurality of light emitters is configured to be distributed across an entire length of the outer edge of the windshield;

a wiring harness being coupled to said molding wherein said wiring harness is configured to be electrically coupled to a power source comprising an electrical system of the motorcycle, each of said light emitters being in electrical communication with said wiring harness, each of said light emitters being turned on when the motorcycle is turned on; and wherein said molding has a first surface, a second surface, and a perimeter edge extending between said first surface and said second surface, said perimeter edge having a front side, a back side, a first lateral side and a second lateral side, said molding being elongated between said first lateral side and said second lateral side, said first surface being concavely arcuate between said front side and said back side having said front side being aligned with said back side such that said first surface defines said channel.

2. The assembly according to claim 1, wherein each of said light emitters is integrated into said second surface of said molding, each of said light emitters being positioned adjacent to said front side of said perimeter edge of said molding wherein each of said light emitters is configured to be positioned on a front surface of the windshield when said molding is positioned on the windshield, said plurality of light emitters being distributed between said first lateral side and said second lateral side of said perimeter edge of said molding.

3. The assembly according to claim 2, wherein each of said light emitters includes a lens, said lens associated with each of said light emitters being exposed on said second surface of said molding, said lens associated with each of said light emitters being comprised of a translucent material wherein said lens associated with each of said light emitters is configured to emit light outwardly through said lens.

4. The assembly according to claim 1, further comprising a conductor being integrated into said molding, said conductor being electrically coupled to each of said plurality of light emitters such that each of said plurality of light emitters is in electrical communication with each other.

5. The assembly according to claim 4, wherein said wiring harness is electrically coupled to said conductor, said wiring harness having a distal end with respect to said first lateral side of said perimeter edge of said molding wherein said distal end is configured to be electrically coupled to the power source.

6. A windshield light strip assembly being attachable to a perimeter of a motorcycle windshield for enhancing visibility of the motorcycle, said assembly comprising:

a molding having a channel being integrated into said molding wherein said molding is configured to receive an outer edge of a windshield on a motorcycle, said molding being elongated wherein said molding is configured to extend along a full length of the outer edge of the windshield, said molding being comprised of a deformable material wherein said molding is configured to accommodate curvature of the outer edge of the windshield, said molding having a first surface, a second surface, and a perimeter edge extending between said first surface and said second surface, said perimeter edge having a front side, a back side, a first lateral side and a second lateral side, said molding being elongated between said first lateral side and said second lateral side, said first surface being concavely arcuate between said front side and said back side having said front side being aligned with said back side such that said first surface defines said channel;

a plurality of light emitters, each of said light emitters being integrated into said molding wherein each of said light emitters is configured to emit light outwardly from said molding, said light emitters being spaced apart from each other and being distributed along a full length of said molding wherein said plurality of light emitters is configured to be distributed across an entire length of the outer edge of the windshield, each of said light emitters being integrated into said second surface of said molding, each of said light emitters being positioned adjacent to said front side of said perimeter edge of said molding wherein each of said light emitters is configured to be positioned on a front surface of the windshield when said molding is positioned on the windshield, said plurality of light emitters being distributed between said first lateral side and said second lateral side of said perimeter edge of said molding, each of said light emitters including a lens, said lens associated with each of said light emitters being exposed on said second surface of said molding, said lens associated with each of said light emitters being comprised of a translucent material wherein said lens associated with each of said light emitters is configured to emit light outwardly through said lens;

a conductor being integrated into said molding, said conductor being electrically coupled to each of said plurality of light emitters such that each of said plurality of light emitters is in electrical communication with each other; and a wiring harness being coupled to said molding wherein said wiring harness is configured to be electrically coupled to a power source comprising an electrical system of the motorcycle, each of said light emitters being turned on when the motorcycle is turned on, said wiring harness being electrically coupled to said conductor, said wiring harness having a distal end with respect to said first lateral side of said perimeter edge of said molding wherein said distal end is configured to be electrically coupled to the power source.

7. A windshield light strip system for enhancing visibility of a motorcycle, said system comprising:

a windshield being mountable to a motorcycle, said windshield having an outer edge and a front surface;

a molding having a channel being integrated into said molding to receive said outer edge of said windshield, said molding being elongated to extend along a full length of said outer edge of said windshield, said molding being comprised of a deformable material to accommodate curvature of said outer edge of said windshield, said molding having a first surface, a second surface, and a perimeter edge extending between said first surface and said second surface, said perimeter edge having a front side, a back side, a first lateral side and a second lateral side, said molding being elongated between said first lateral side and said second lateral side, said first surface being concavely arcuate between said front side and said back side having said front side being aligned with said back side such that said first surface defines said channel;

a plurality of light emitters, each of said light emitters being integrated into said molding wherein each of said light emitters is configured to emit light outwardly from said molding, said light emitters being spaced apart from each other and being distributed along a full length of said molding such that said plurality of light emitters is distributed across an entire length of said outer edge of said windshield, each of said light emitters being integrated into said second surface of said molding, each of said light emitters being positioned adjacent to said front side of said perimeter edge of said molding such that each of said light emitters is positioned on said front surface of said windshield when said molding is positioned on said windshield, said plurality of light emitters being distributed between said first lateral side and said second lateral side of said perimeter edge of said molding, each of said light emitters including a lens, said lens associated with each of said light emitters being exposed on said second surface of said molding, said lens associated with each of said light emitters being comprised of a translucent material wherein said lens associated with each of said light emitters is configured to emit light outwardly through said lens;

a conductor being integrated into said molding, said conductor being electrically coupled to each of said plurality of light emitters such that each of said plurality of light emitters is in electrical communication with each other; and a wiring harness being coupled to said molding wherein said wiring harness is configured to be electrically coupled to a power source comprising an electrical system of the motorcycle, each of said light emitters being turned on when the motorcycle is turned on, said wiring harness being electrically coupled to said conductor, said wiring harness having a distal end with respect to said first lateral side of said perimeter edge of said molding wherein said distal end is configured to be electrically coupled to the power source.

* * * * *